Aug. 13, 1940.　　　　　V. J. GRAF　　　　　2,210,933
METHOD OF MAKING LAVATORIES
Filed Jan. 27, 1936　　　5 Sheets-Sheet 2
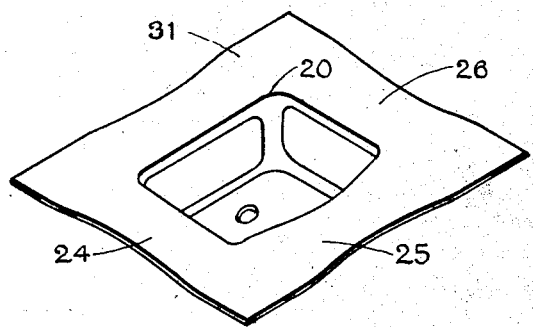
Fig. 4
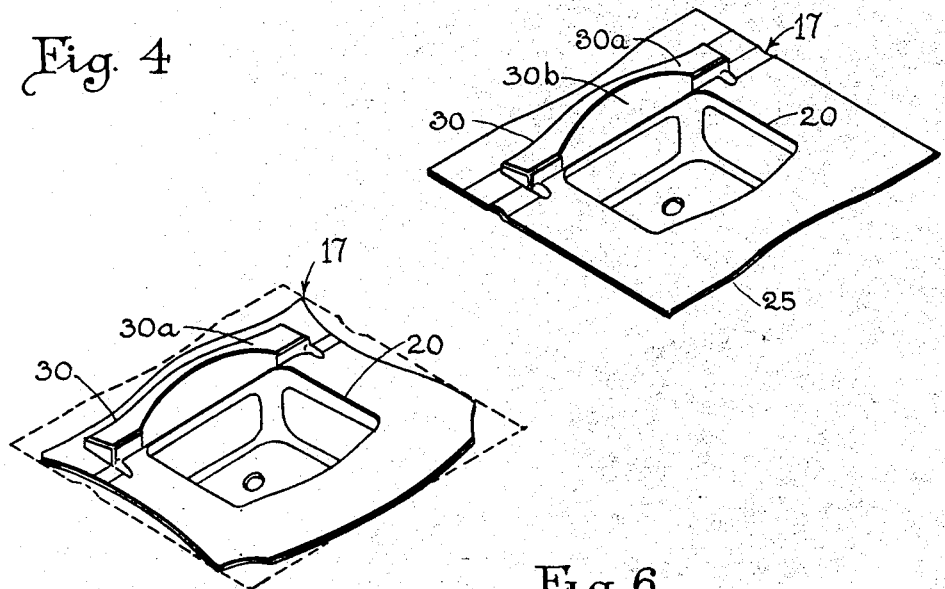
Fig. 5
Fig. 6
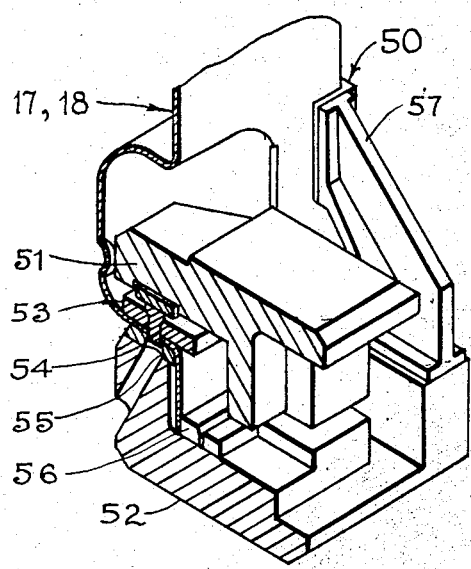
Fig. 7
VINCENT J. GRAF
INVENTOR
BY
Dike, Calver Gray
ATTORNEYS Aug. 13, 1940.  V. J. GRAF  2,210,933
METHOD OF MAKING LAVATORIES
Filed Jan. 27, 1936   5 Sheets-Sheet 3
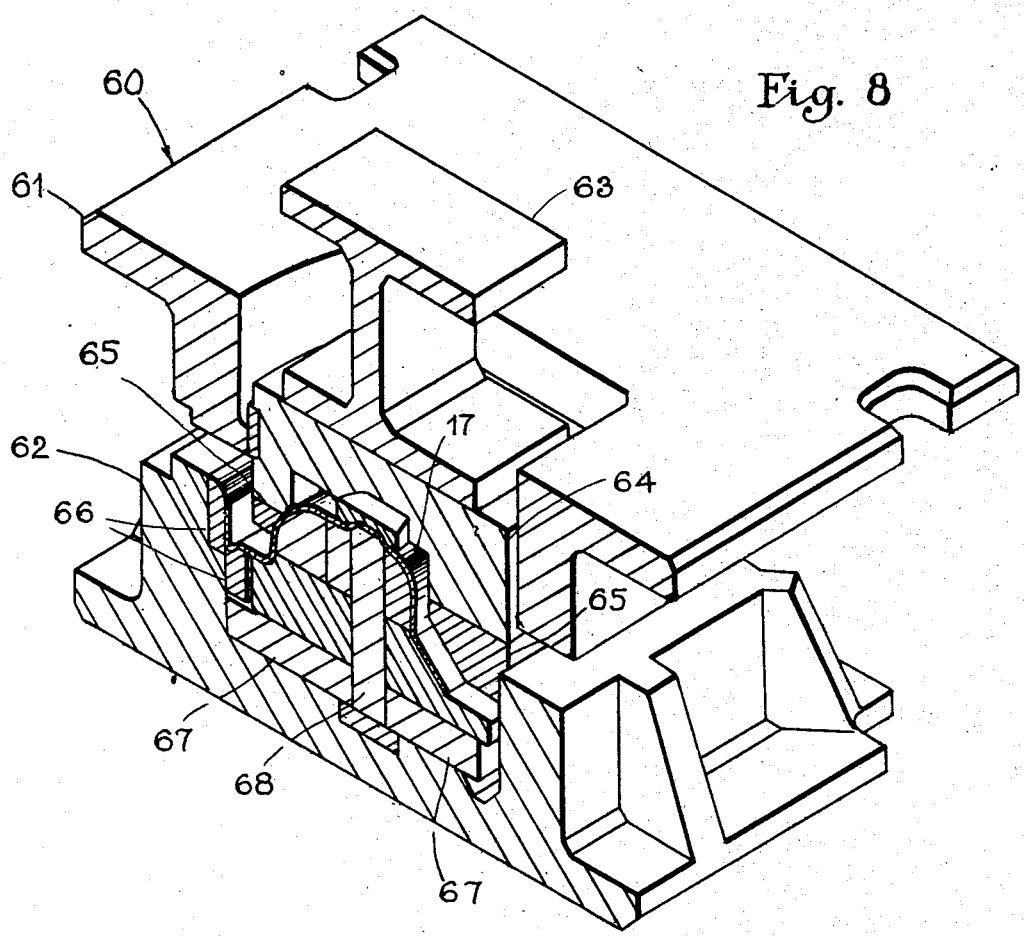
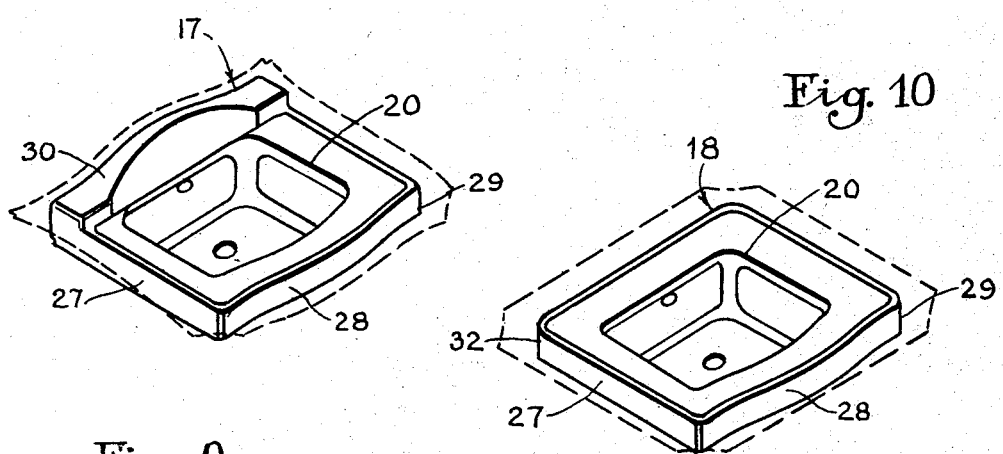
VINCENT J. GRAF
INVENTOR
BY Dike, Calvert & Gray
ATTORNEYS Aug. 13, 1940.  V. J. GRAF  2,210,933
METHOD OF MAKING LAVATORIES
Filed Jan. 27, 1936  5 Sheets-Sheet 4
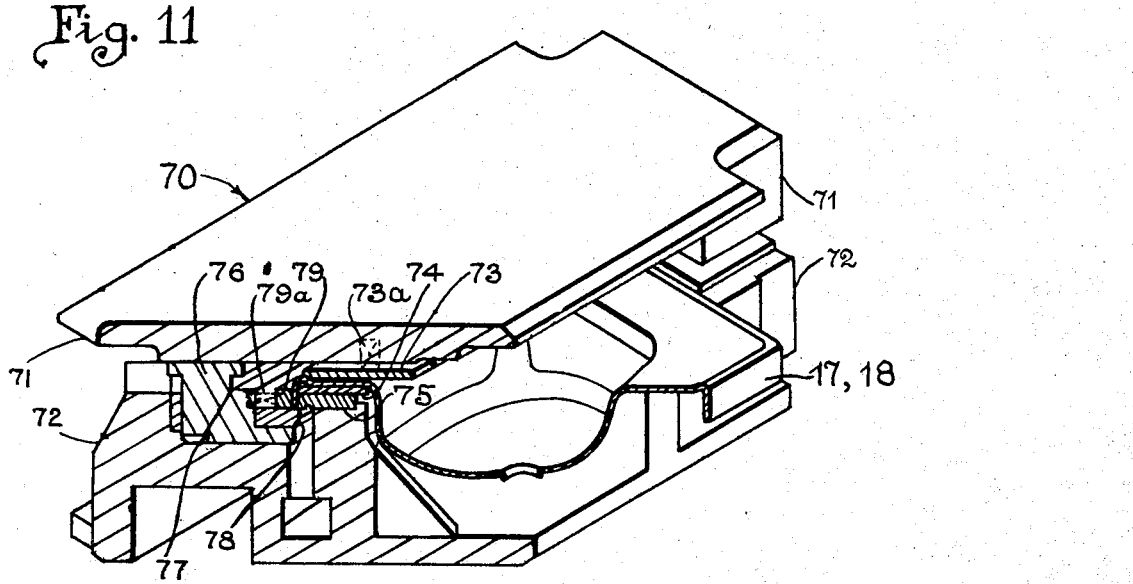
Fig. 11
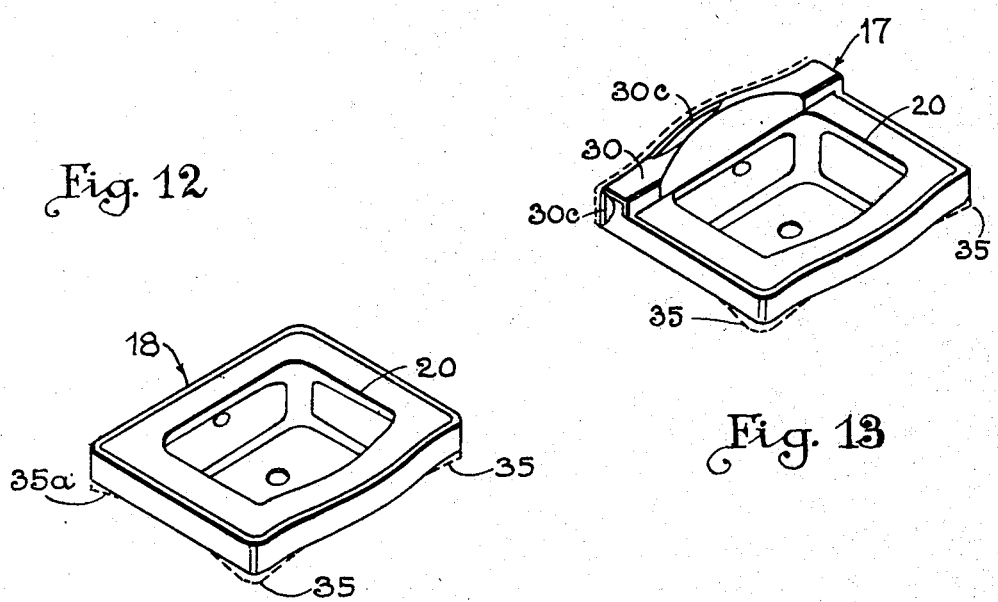
Fig. 12
Fig. 13
VINCENT J. GRAF
*INVENTOR*
BY Dike, Calver & Gray
*ATTORNEYS*

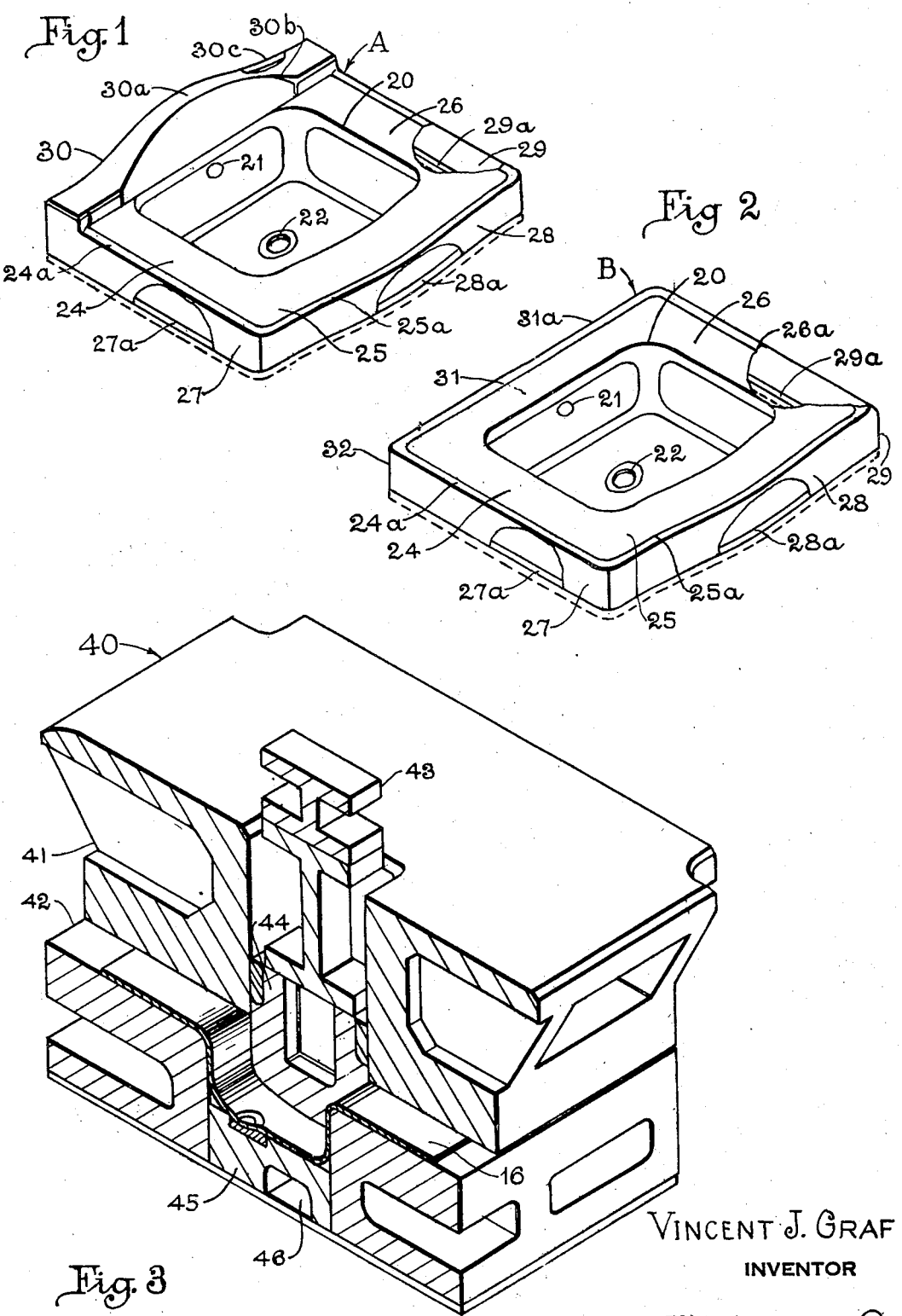

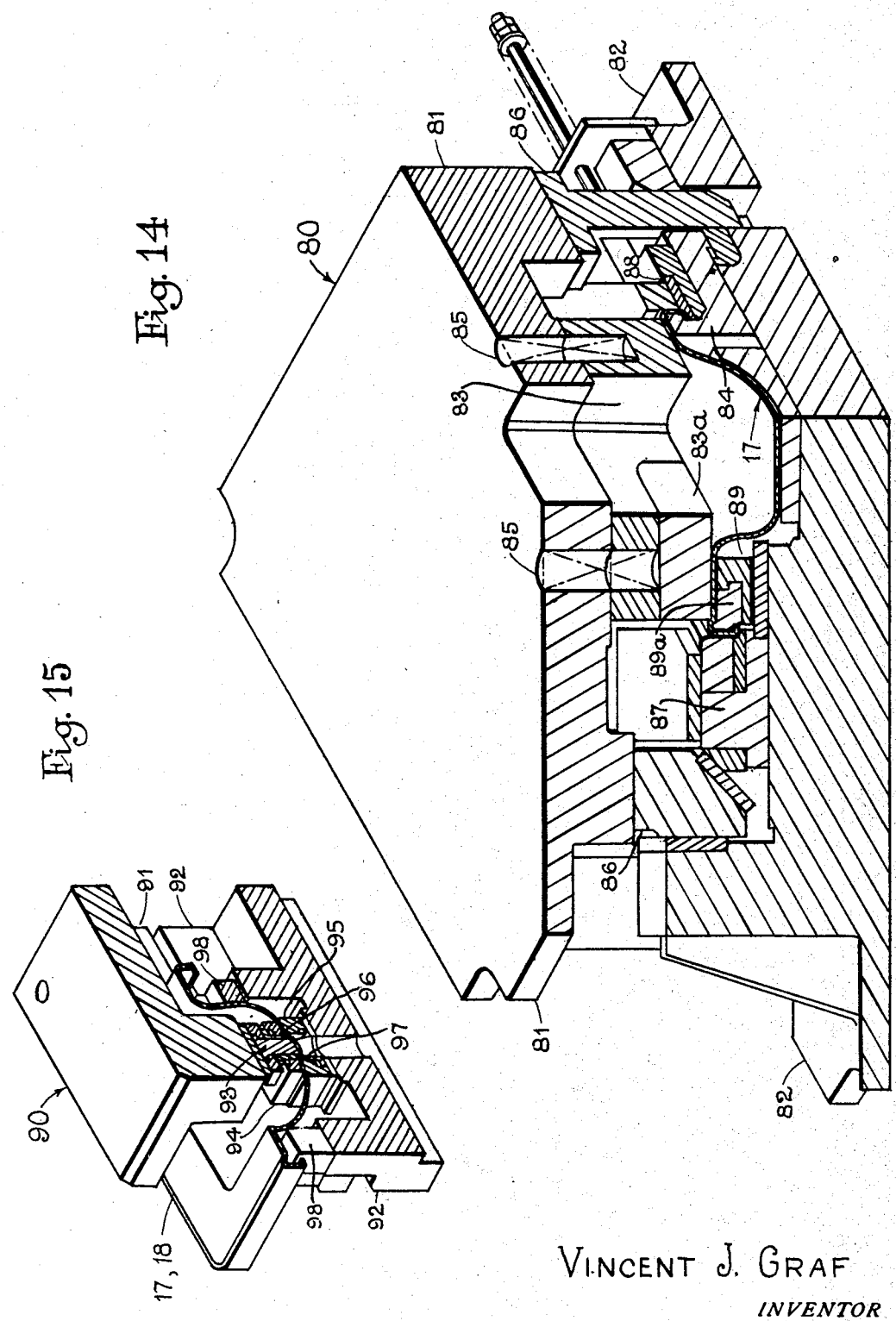

Patented Aug. 13, 1940

2,210,933

UNITED STATES PATENT OFFICE 2,210,933

METHOD OF MAKING LAVATORIES

Vincent J. Graf, Detroit, Mich., assignor to Briggs Manufacturing Company, Detroit, Mich., a corporation of Michigan Application January 27, 1936, Serial No. 61,015

10 Claims. (Cl. 113—120)

This invention relates to methods for manufacturing by stamping operations from sheet metal articles such as lavatories, sinks, basins, and the like, and more particularly to the manufacture of pressed-out articles of several types having common as well as distinct elements.

Dies for performing operations on articles of the type here referred to are extremely expensive, not only because of the many operations required in manufacturing of such articles, but also because of the size of the dies required, the dies having to be made big enough to accommodate a single blank. It is commonly known that one of the principal items of expense in the manufacture of pressed-out articles of the character mentioned is the cost of dies. In many instances the initial investment required for such dies is prohibitively large, and in consequence thereof a great number of articles of large size, which are capable of being produced by stamping operations, are still produced by more expensive and often wasteful old methods which do not require large initial investment in manufacturing equipment.

Presses used in the production of articles of the character described are large and expensive machines. For economical operation it is highly desirable to have as few of these machines as possible, and further to have them operating as long as possible without interruptions, or, as it is usually expressed in the language of the art, to have these machines operating at a high load factor. One of the instances of objectionable interruption of continuous operation of presses is changing of dies. Die changing operations are long and tedious, and they require skilled and expensive labor. It is obvious that these operations cannot be economically eliminated by increasing the number of presses or by having the largest dies set up permanently in special presses, since this will decrease the load factor on each machine and will greatly increase the initial investment in the equipment. In such a case many presses would remain idle for days and weeks, and would become obsolete long before they give the amount of service for which they were originally designed. It should be particularly noted that the cost of providing and maintaining necessary factory space for such idle machines would greatly increase the cost of the articles produced. The problem becomes particularly difficult when it is desirable to produce several types of articles of the same general character, each type having certain distinct features, as is the case, for example, in the production of lavatories with and without upstanding back portions. In such cases, if special dies and presses are provided for each type for all operations performed thereon, the cost of manufacture becomes exceedingly great.

Accordingly it is one of the objects of the present invention to provide a novel method for producing articles by stamping operations, whereby a maximum number of different types of such articles may be manufactured with a minimum number of dies and presses.

Another object of the invention is to reduce the time which is necessary for die setting operations and to decrease the expense connected with these long and tedious operations.

A still further object of the invention is to eliminate a number of dies which are necessary in manufacturing lavatories with and without upstanding back portions.

Other objects and advantages of this invention will appear in the following description and appended claims, reference being had to the accompanying drawings forming a part of this specification wherein like reference characters designate corresponding parts in the several views.

Fig. 1 is a perspective view of a finished sheet metal lavatory with upstanding back portion, made in accordance with the present invention.

Fig. 2 is a similar view of a lavatory without upstanding back portion.

Fig. 3 is a perspective view showing in vertical transverse section a die mechanism for forming the basin portions of lavatories of either type, a sheet metal blank also being shown in operative position.

Fig. 4 is a perspective view of the sheet metal blank after the formation of the basin.

Fig. 5 is a perspective view of the metal sheet intended for a lavatory with back, after the operation of drawing the back is completed.

Fig. 6 is a perspective view of the metal sheet of Fig. 5 after said sheet is trimmed complete.

Fig. 7 is a perspective view showing in vertical transverse section the die mechanism for piercing the overflow holes in the metal blanks for lavatories of either type, a blank also being shown in operative position.

Fig. 8 is a perspective view showing in vertical section the die mechanism for drawing front and side flanges, and embossing the basing face of the metal blank for the lavatory with back.

Fig. 9 illustrates the metal blank after the operation performed by the die of Fig. 8 is completed.

Fig. 10 is a perspective view of the metal blank for the lavatory without back after the flanges are drawn.

Fig. 11 is a perspective view showing in vertical diagonal section the die mechanism for retrimming front corners of the metal blanks for lavatories of either type.

Fig. 12 is a perspective view of the metal blank after same emerges from the die mechanism shown in Fig. 11.

Fig. 13 is a perspective view of the metal blank for lavatory with back after flanging the rear thereof.

Fig. 14 is a perspective view showing in vertical section the interchangeable die mechanism with replaceable die inserts, set to be used on the metal blank for lavatory with back.

Fig. 15 is a perspective view showing in vertical section the die mechanism for piercing and offsetting drain holes in the metal blanks for either type of lavatories.

For convenience in understanding my invention I shall refer to two types of lavatories and to the dies for operating thereon. However, it is to be expressly understood that my invention is not limited to this specific number of types of the above articles, or to the types per se, or the general character of the articles.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings exemplifying one embodiment of the present invention, A and B designate generally two lavatories manufactured in accordance with the invention. Said lavatories A and B are of two distinct types; however, they comprise a number of common as well as distinct elements corresponding to each other not only in their character and location, but in their sizes as well. Each of said lavatories comprises a basin or a sump portion 20 provided with overflow and drain holes 21 and 22, respectively. Other common elements of both lavatories are represented by continuous horizontal flanges 24, 25 and 26 surrounding said basin portion at its three sides and extending outwardly therefrom. Said flanges 24, 25 and 26 have depending apron portions 27, 28 and 29, respectively, which are flanged at their bottom portions as illustrated at 27a, 28a and 29a, respectively. The apron portions 28, 28 of the lavatories A and B are made of a curved configuration, as shown, in order to give the lavatories more pleasing appearance. The flanges 24, 25 and 26 are provided at their outer margins, that is to say at the places of juncture with the depending aprons 27, 28 and 29, with rolled rim or bead portions 24a, 25a and 26a, respectively.

As its distinct feature, the lavatory A comprises a back portion 30 extending upwardly at the back of the basin 20. At its top, said upstanding portion 30 terminates in a curved surface 30a, and its side adjacent to the basin 20 is provided with an inclined surface 30b. The rear marginal edge of the surface 30a as well as the rear extremities of the aprons 27 and 29 of said lavatory A are flanged such as at 30c of Fig. 1.

As its distinct feature, the lavatory B comprises a horizontal flange 31 provided with a rim 31a and a depending flange 32. By virtue of possessing said feature, the lavatory B has a continuous horizontal rimmed flange with a depending flanged apron extending on all four sides of the basin 20.

It is important to the most effective carrying out of my invention that sheet metal articles which are to be manufactured in accordance therewith have as many common elements as it is practical to have without affecting the distinct features of a specific type of article.

In accordance with the present invention similar metal sheets are used for both types of lavatories. Such sheets are cut to size, rolled, and are operated upon in the die mechanism shown in Fig. 3 where the basin portion 20 is formed. The blank as it issues from the die mechanism of Fig. 3 is shown in Fig. 4, and in this state it comprises the basin portion 20 surrounded by the flange portions 24, 25, 26 and 31. Preferably, the drainhole 22 is preliminarily embossed without piercing in said die mechanism as indicated in the drawings, final embossing and piercing of said hole being done at any of the later stages of manufacture, as presently explained.

The die mechanism of Fig. 3, wherein it is designated generally by the numeral 40, is adapted to be used in a vertical double-acting press, and it comprises generally the blank retaining and the forming means. The blank retaining means are represented by the upper member or outer slide of the press 41 cooperating with the lower member or lower half of the die 42, between which members the metal blank 16 is held when forming. Said members 41 and 42 are affixed in a well known manner to the ram and to the bed of the press, respectively. The forming means of said die 40 comprise an inner slide 43 carrying a forming punch 44 and a pressure pad 45 held in the recess 46 of the lower member 42. Said recess 46 serves as a female member for the punch 44, as can be clearly seen from Fig. 3.

Upon completion of the forming operation in the die 40 the blank for the lavatory with a splash back is subjected to a drawing operation to form the back 30, see Fig. 5, and then to a trimming operation by which all four marginal edges are trimmed, see Fig. 6. The blank for the lavatory with back is generally designated in Figs. 5 and 6 by the numeral 17 after it has been operated upon in the dies (not shown) suitable for performing the above described splash back forming and trimming operations. In the meantime, the blanks for lavatories without backs, generally designated by the numeral 18, are operated upon in a suitable trimming die mechanism by which the surrounding marginal edges of each blank are trimmed complete.

After the foregoing operations the blanks 17 and 18 for both types of lavatories are operated upon in the same die designed for piercing overflow holes 21, 21. Such a die is shown in Fig. 7 wherein it is generally designated by the numeral 50. Said die 50 comprises a punch holder 51 carrying a punch 54 and a lower member or die shoe 52. The members 51 and 52 are affixed in a well known manner to the ram and to the bed, respectively, of a suitable press. In operation, the blank is held between the stripper 53 and the cutting member 55, and it is properly located with respect to the punch 54 by being held against an abutment 56 and a bracket 57.

The next operation to be performed on the blanks comprises forming depending aprons and rolled rims at the outer marginal edges of the horizontal flanges. This operation for the two types of lavatories is performed in separate dies. In Fig. 8 there is shown a die mechanism for performing the above operation on the blank 17 for the lavatory with back. Said die, designated generally by the numeral 60, comprises a punch ring 61 and a die shoe 62 which ring 61 and shoe 62 are affixed in a well known manner to the ram and to the bed, respectively, of a suitable double-acting press. The die shoe 62 is provided with a suitable aperture or recess for the reception of a pressure pad 67, a number of lower forming members 66, 66 and an embossing punch 68, the latter forming a circular recess at the locality of the drain hole. An inner member or riser 63 carries a punch 64 provided with upper steel forming members 65, 65. Fig. 9 illustrates the blank 17 after the same emerges from said die 60, the dotted line showing the outline of the blank before said operation of forming the aprons and marginal rolled rim. The die mechanism used for forming the continuous depending apron 27, 28, 29 and 32 around four sides of the blank 18, i. e., the blank for the lavatory without back, is not illustrated as it will be readily understood that the same may be made very similar to the die mechanism 60. The blank 18, after flanging, is shown in Fig. 10 which figure illustrates said blank 18 after the continuous rimmed flanges and the depending apron are formed at all four sides of the basin portion thereof.

Next in sequence is the operation of retrimming the apron corners 35, 35, and 35a. This operation differs in the two types of the blanks in the respect that the blank for the lavatory with back need only be retrimmed at the two front corners while the blank for the lavatory without back requires retrimming at all its four corners 35 and 35a. In accordance with the present invention, retrimming of the front corners 35, 35 is done in the same die which is used interchangeably for both types of blanks. For the operation of retrimming the rear corners 35a of the lavatory without back a separate die is provided. By such an arrangement a substantial economy in the cost of retrimming dies is effected. Figs. 12 and 13 show the blanks 17 and 18 after the operation of retrimming the front corners at 35, 35 is completed. Portions of metal which are removed in this operation are shown by the dotted lines, as at 35, 35.

Fig. 11 illustrates the die mechanism used interchangeably on both types of blanks for performing the above described operation of retrimming the front corners. Said die mechanism, designated generally by the numeral 70, comprises a punch holder 71 and a die shoe 72, which are affixed in some suitable manner respectively to the ram and to the bed of a suitable press. The punch holder 71 and the die shoe 72 carry the blank retaining means and two similar cam actuated mechanisms located at the corners of said die 70. Although Fig. 11 shows in section only one of said cam actuated cutting mechanisms, it will be understood that there is another similar cutting mechanism at the other end of said die 70 and that the following description of the cutting mechanism is equally applicable to both of said cutting mechanisms. The cam 76, which is carried by the punch holder 71, in its downward movement actuates a cam slide 77, which cam slide carries a lower cutting member 78. The upper cutting member 75 is affixed to the die shoe 72. The blank retaining means comprise pressure pads 73 and 79 which are carried respectively by the punch holder 71 and the cam slide 77. A number of guide bolts (not shown) operate to hold said pressure pads 73 and 79 in limited slidable relationship with respect to said punch holder 71 and said cam slide 77, permitting a certain amount of movement of said pads 73 and 79 toward the blank when the same is in its operative position. A number of springs, such as shown at 73a and 79a, operate to force said pressure pads into their extended positions in the direction of the blank. Thus, in operation, the pressure pads 73 and 79 come in contact with the blank 17 or 18, before the cutting member 78 reaches the same, the pressure of the springs 73a and 79a holding the blank securely during the operation. The die mechanism for retrimming the corners 35a, 35a at the rear of the blank 18 (for the lavatory without back) is not shown in the drawings, since in its construction it is very similar to the above described die 70.

While the blank 18 is being retrimmed at its rear corners 35a, the blank 17 is operated upon in a die mechanism in which the back flanges 30c along the top and ends of the upstanding back portion 30 are formed. The blank 17 with the flanges 30c so formed is illustrated in Fig. 13, the dotted line representing the edge of the blank 17 before it is flanged. It will be understood that the back flanges at the ends of the splash back extend inwardly toward each other and the back flange along the marginal edge of the top of the splash back extend downwardly.

The operation of flanging the front and side aprons, that is to say, forming the inwardly directed flanges 27a, 28a, and 29a (see Figs. 1 and 2), is performed in a die mechanism which is used interchangeably for both types of lavatory blanks, said mechanism being adapted for the reception of a particular type of lavatory blank by the use of replaceable inserts corresponding in their configuration to that of the respective type of lavatory blank. Such die mechanism, adapted to receive the blank for the lavatory with back, is shown in Fig. 14 where it is generally designated by the numeral 80. The blank 17 is also shown in said figure in its operative position. The die mechanism 80 comprises a punch holder 81 and a die shoe 82 ffixed in a well known manner to the ram and to the bed, respectively, of a suitable press. The punch holder 81 carries a spring pad 83 provided with a replaceable pad insert 83a, which pad and insert cooperate with springs 85, 85 to hold the blank in position during the operation. Cam slides 87 and 84 cooperate with steel forming inserts 88 and 89 in forming the flanges. Said cam slides are actuated by cams 86, 86, carried by the punch holder 81. When the die mechanism 80 is used on the blank for the lavatory without back, the inserts 83a and 89a are removed and replaced with suitable units to conform to the configuration of the back flange portion 31 of the blank 18. It should be noted that another flange forming mechanism similar to that operating on the flange 29 is located at the other part of the die 80, which part is not shown in Fig. 14, such mechanism being adapted to operate on the flange 27 of either the blank 18 or the blank 17.

The operation of piercing and offsetting faucet holes in the blanks is next in sequence. If the faucet holes in the blank for lavatory with back are located differently than the holes in the blank for lavatory without back, as is the case in the present instance, two separate die mechanisms have to be used for performing this operation. Any suitable die mechanisms may be used for this purpose.

The operation of piercing and offsetting the drain holes 22, 22, is performed in a die mechanism which is used interchangeably for both types of blanks. Fig. 15 illustrates such die mechanism, also showing the blank in operative position in the die. Said die mechanism, designated generally by the numeral 90, comprises a punch holder 91 and a die shoe 92, affixed respectively to the ram and to the bed of a suitable press. The punch holder 91 carries a punch 93 and a spring pad 94, which pad is affixed to the punch holder 91 in a manner well known in the art. A number of compression springs situated between said punch holder 91 and the spring pad 94 operate to hold said pad 94 in its extended position, away from the punch holder 91. Pad 94 cooperates with a pressure pad 95 affixed to the die shoe 92 in holding the lavatory blank in the die during the operation. It should be understood that during the down stroke of the punch holder 91, the spring pad 94, which is held in its extended position by the springs, reaches the blank before the punch 93 and presses the blank against the pressure pad 95. Thus, when the punch 93 approaches the blank, the same is securely held between the spring pad 94 and the pressure pad 95. Offsetting the drain hole is effected by an upper forming member or forming sleeve 96 carried by the punch holder 91, which upper forming member 96 cooperates with the lower forming member 97 held in a suitable recess in the pressure pad 95. Blocks 98, 98 serve as abutments and operate to locate the blank in the die. It is to be understood that the above operation of piercing and offsetting the drainhole 22 may be performed with the aid of the die mechanism 90 at any stage of manufacture, preferably after the embossing of said hole.

It is apparent, in view of the foregoing, that by application of my invention to the manufacturing by stamping operations of two types of lavatories, herein described, thereby combining similar stamping operations on blanks of different types in the same die, I am able to eliminate entirely five expensive die mechanisms, otherwise indispensable. Namely, instead of using separate dies in respect to each type of lavatory blank for forming the basin 20, for retrimming the corners at the front, for flanging the front and sides, and, finally, for piercing and offsetting the drain hole, that is to say, instead of employing ten separate die mechanisms, I am able to effect the same results with the use of only five die mechanisms.

In one of its broader aspects my invention contemplates providing a novel method and apparatus for forming sheet metal parts by stamping operations, whereby a maximum number of different types of such parts may be formed with the use of a minimum number of dies and presses. In its present embodiment, herein described by way of example, namely in its application to manufacturing of lavatories, my invention contemplates producing two distinct types of lavatories using the same dies for a majority of the stamping operations. In accordance with this embodiment similar metal blanks are used, and the first few operations are performed thereon in the same machine tools and dies, irrespective of the type of blank. Thereupon, the blanks are operated upon in the dies designed for forming distinctive portions thereof, and in so many of them as not to prevent reception of the blanks by the dies which are later to be used interchangeably on both types of blanks. In other words, the path or flow of the blanks in a factory is divided into two branches leading to separate dies for forming distinct elements of the construction, and it is again united in one path leading to a die in which common elements are formed. Such division and uniting of the path or flow of the blanks in production operations may be effected any predetermined number of times.

Although only one embodiment of the invention has been illustrated and described, numerous changes and modifications in the apparatus employed as well as in the sequence of stamping operations will now appear to those skilled in the art, and the same may be made without departing from the scope of my invention. For instance, articles other than lavatories, and more than two types thereof may be manufactured in accordance with my invention.

I claim:

1. The method of making a lavatory, wash basin or the like from a metal blank, comprising the steps of drawing said blank to provide a fluid receiving bowl or basin while leaving generally horizontal flange-like extensions around the four sides of the bowl, offsetting upwards the metal of one of said extensions by a drawing operation to form a rearwardly flanged upstanding back at the rear side of the bowl, and bending said other extensions to provide downturned flanges around the three remaining sides of the bowl.

2. The method of making a lavatory, wash basin or the like from a metal blank, comprising the steps of drawing said blank to provide a fluid receiving bowl or basin while leaving generally horizontal flange-like extensions around the four sides of the bowl, offsetting upwards the metal of one of said extensions by a drawing operation to form a rearwardly flanged upstanding back at the rear side of the bowl, and pressing said other extensions to form a continuous generally horizontal ledge extending continuously around three sides of the bowl and terminating in a rim formed as an integral part of a depending apron.

3. The method of making a lavatory, wash basin or the like which includes the steps of drawing a fluid receiving bowl in a metal sheet while leaving relatively wide marginal portions of the metal around the four sides of the bowl, drawing up the rear marginal portion into a rearwardly flanged back, and flanging down the remaining marginal portions to form a rim extending around three sides of the bowl and formed as a part of a depending apron.

4. The method of making a lavatory, wash basin or the like which includes the steps of drawing a fluid receiving bowl in a metal sheet while leaving relatively wide marginal horizontal portions of the metal around the four sides of the bowl, drawing up the rear marginal portion intermediate the ends thereof into a rearwardly flanged back, and flanging down the remaining marginal portions to form a rim extending around three sides of the bowl and formed as a part of a depending apron.

5. The method of making a lavatory, wash basin or the like which includes the steps of drawing a fluid receiving bowl in a metal sheet while leaving relatively wide marginal portions of the metal around the four sides of the bowl, drawing up the rear marginal portion into a rearwardly flanged back having end portions forming extensions of said marginal portions at two sides of the bowl, and flanging down said marginal portions and end portions to form an apron extending around three sides of the bowl.

6. The method of making a lavatory, wash basin or the like which includes the steps of drawing a fluid receiving bowl in a metal sheet while leaving relatively wide marginal portions of the metal around the four sides of the bowl, drawing up the rear marginal portion into a rearwardly flanged back having end portions forming extensions of said marginal portions at two sides of the bowl, and flanging down said marginal portions and end portions along a line extending around three sides of the bowl and terminating substantially at the junctures of said back and end portions to provide an apron flange and rim merging seamlessly into said back.

7. The method of making a lavatory, wash basin or the like which includes the steps of drawing a fluid receiving bowl in a metal sheet while leaving outwardly extending substantially horizontal portions of the metal around all four sides of the bowl, drawing up one of said horizontal portions into a rearwardly flanged back, and flanging down said other extensions.

8. The method of making a lavatory, wash basin or the like which includes the steps of drawing a fluid receiving bowl in a metal sheet while leaving outwardly extending substantially horizontal portions of the metal around all four sides of the bowl, drawing up one of said horizontal portions into a rearwardly flanged back while leaving marginal portions of the metal along the ends and rear thereof, and flanging down said extensions and marginal portions.

9. The method of making a lavatory, wash basin or the like which includes the steps of drawing a fluid receiving bowl in a metal sheet while leaving outwardly extending substantially horizontal portions of the metal around all four sides of the bowl, drawing up one of said horizontal portions into a rearwardly flanged back with extensions of the metal beyond the ends of the back forming continuations of the horizontal portions of the metal at opposite sides of the bowl, and flanging down said extensions and horizontal portions to provide a rim merging seamlessly into the ends of the back.

10. The method of making a lavatory, wash basin or the like which includes the steps of drawing a fluid receiving bowl in a metal sheet while leaving outwardly extending substantially horizontal portions of the metal around all four sides of the bowl, drawing up one of said horizontal portions into a rearwardly flanged back with extensions of the metal beyond the ends of the back forming continuations of the horizontal portions of the metal at opposite sides of the bowl, and bending down said extensions and horizontal portions along a line extending around three sides of the bowl and terminating substantially at the ends of the back to provide a continuous generally horizontal edge and a rim around three sides of the bowl merging seamlessly into said back.

VINCENT J. GRAF.

CERTIFICATE OF CORRECTION.

Patent No. 2,210,933. August 13, 1940.

VINCENT J. GRAF.

It is hereby certified that error appears in the printed specification of the above numbered patent requiring correction as follows: Page 5, second column, line 32, claim 10, for the word "edge" read --ledge--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patent